(12) United States Patent
Chi et al.

(10) Patent No.: US 12,512,783 B2
(45) Date of Patent: Dec. 30, 2025

(54) WINDOW OPERATION MANAGEMENT SYSTEM

(71) Applicant: YANGTZE UNIVERSITY, Hubei (CN)

(72) Inventors: Fang'ai Chi, Hangzhou (CN); Shuting Zhang, Hangzhou (CN); Jiang Long, Hangzhou (CN); Shishu Tong, Hangzhou (CN); Zhechen Shen, Hangzhou (CN)

(73) Assignee: YANGTZE UNIVERSITY, Jingzhou (CN)

( * ) Notice: Subject to any disclaimer, the term of this patent is extended or adjusted under 35 U.S.C. 154(b) by 198 days.

(21) Appl. No.: 18/524,954

(22) Filed: Nov. 30, 2023

(65) Prior Publication Data

US 2025/0183840 A1   Jun. 5, 2025

(51) Int. Cl.
| | | |
|---|---|---|
| H02S 20/32 | (2014.01) | |
| H02S 50/00 | (2014.01) | |
| G06F 119/06 | (2020.01) | |
| H10F 77/00 | (2025.01) | |

(52) U.S. Cl.
CPC .............. *H02S 20/32* (2014.12); *H02S 50/00* (2013.01); *F24D 2200/14* (2013.01); *G06F 2119/06* (2020.01); *H02J 2300/24* (2020.01); *H10F 77/955* (2025.01); *Y02E 10/56* (2013.01)

(58) Field of Classification Search
CPC ...... H02S 20/32; H02S 50/00; F24D 2200/14; G06F 2119/06; H02J 2300/24; H10F 77/955; Y02E 10/56
See application file for complete search history.

(56) References Cited

U.S. PATENT DOCUMENTS

| | | | | |
|---|---|---|---|---|
| 2011/0079266 A1* | 4/2011 | Pan | .......................... | F24S 50/20 |
| | | | | 136/246 |
| 2011/0220182 A1* | 9/2011 | Lin | .......................... | H02S 50/00 |
| | | | | 136/251 |
| 2015/0101761 A1* | 4/2015 | Moslehi | .................. | F24S 23/82 |
| | | | | 160/107 |
| 2020/0317563 A1* | 10/2020 | Sakai | .................... | C03C 17/009 |

* cited by examiner

*Primary Examiner* — Michael Y Sun
(74) *Attorney, Agent, or Firm* — HOWARD M COHN and Associates, LLC

(57) ABSTRACT

A window operation management system relates to a technical field of window operation supervision and includes a server, a photovoltaic power generation device, a sun tracking feedback device, an operation matching control device, a photovoltaic angle regulation detection analysis device and a power generation stability supervision device. The operation matching control device determines the regulation scheme based on sun tracking information and an angle regulation strategy and drives the photovoltaic power generation device to regulate the tracking angle, so that the photovoltaic power generation device receives solar energy to the maximum extent. Further, the photovoltaic angle regulation detection analysis device detects and analyzes the angle regulation operation of the photovoltaic power generation device to determine whether the angle regulation operation is qualified or unqualified and to evaluate the abnormal regulation condition of the operation matching control device in the photovoltaic detection period.

9 Claims, 2 Drawing Sheets

WINDOW OPERATION MANAGEMENT SYSTEM

TECHNICAL FIELD

The present disclosure relates to a technical field of window operation supervision, and in particular to a window operation management system based on an integrated sun tracker.

BACKGROUND

Solar photovoltaic power generation refers to a technology directly converting light energy into electrical energy by using the photovoltaic effect at semiconductor interfaces, and a core application thereof is photovoltaic power generation devices. A core of the photovoltaic power generation devices is solar panels (device) composed of electronic components. The electronic components are connected in series and packaged to form the solar panels, and then the solar panels are combined with power controllers and other components to form a photovoltaic power generation device. In current buildings, a solar photovoltaic power generation system is generally installed on a roof or a wall thereof, and is often assembled with a window glass to form a photovoltaic glass.

When the window equipped with a photovoltaic power generation device is in use, an angle of the photovoltaic power generation device is generally fixed, making it impossible to track the sun and realize automatic regulation of a power generation angle. Therefore, it is difficult for the photovoltaic power generation device to receive solar energy to the maximum extent, and a control status and a power generation status of the photovoltaic power generation device cannot be reasonably evaluated, which is not conducive to improving power generation efficiency and ensuring safe and stable operation of the photovoltaic power generation device.

In view of the above technical defects, a solution is proposed.

SUMMARY

The present disclosure provides a window operation management system based on an integrated sun tracker, which solves problems that it impossible to track the sun and realize automatic regulation of a power generation angle, it is difficult for the photovoltaic power generation device to receive solar energy to the maximum extent, and a control status and a power generation status of the photovoltaic power generation device cannot be reasonably evaluated. These problems are not conducive to improving power generation efficiency and ensuring safe and stable operation of the photovoltaic power generation device.

To solve the problems, the present disclosure provides the window operation management system. The window operation management system comprises a server, a photovoltaic power generation device, an energy storage device, a sun tracking feedback device, an operation matching control device, a photovoltaic angle regulation detection analysis device and a power generation stability supervision device.

The photovoltaic power generation device is installed on a glass of a window. The photovoltaic power generation device generates power by converting solar energy into electric energy and transmits the electric energy to the energy storage device. The energy storage device is configured to store the electric energy.

The sun tracking feedback device is configured to sense a position of the sun through a light sensor so as to automatically track a movement of the sun. The sun tracking feedback device is further configured to send sun tracking information to the operation matching control device through the server.

The operation matching control device is configured to retrieve an angle regulation strategy of the photovoltaic power generation device from the server. The operation matching control device is further configured to determine a regulation scheme based on the sun tracking information and the angle regulation strategy and drive the photovoltaic power generation device to regulate a tracking angle according to the regulation scheme, so that the photovoltaic power generation device receives the solar energy to a maximum extent.

The photovoltaic angle regulation detection analysis device is configured to detect and analyze an angle regulation operation of the photovoltaic power generation device and determine the angle regulation operation is qualified or unqualified. The photovoltaic angle regulation detection analysis device is further configured to analyze and evaluate an abnormal regulation condition of the operation matching control device in a photovoltaic detection period to generate a photovoltaic angle regulation normal signal or a photovoltaic angle regulation abnormal signal, and send the photovoltaic angle regulation normal signal or the photovoltaic angle regulation abnormal signal to the server.

The power generation stability supervision device is configured to detect and analyze a power generation process of the photovoltaic power generation device to generate a power generation stability qualified signal or a power generation stability unqualified signal, and is configured to send the power generation stability qualified signal or the power generation stability unqualified signal to the server.

Furthermore, after the operation matching control device controls the photovoltaic power generation device to complete the angle regulation operation, the photovoltaic angle regulation detection analysis device collects a final tracking angle of the photovoltaic power generation device, marks the final tracking angle as a measured actual regulation angle value, obtains a required tracking angle to be reached by the angle regulation operation based on the regulation scheme, marks the required tracking angle as a regulation standard angle value, performs a difference calculation on the measured actual regulation angle value and the regulation standard angle value, and takes an absolute value thereof as an angle regulation difference value of the angle regulation operation.

If the angle regulation difference value exceeds a predetermined angle regulation difference threshold, the photovoltaic angle regulation detection analysis device determines that the angle regulation operation is unqualified.

If the angle regulation difference value does not exceed the predetermined angle regulation difference threshold, the photovoltaic angle regulation detection analysis device collects a time when the operation matching control device determines the regulation scheme and marks as a scheme determination moment. The photovoltaic angle regulation detection analysis device collects a time when the photovoltaic power generation device starts to perform the angle regulation operation and marks as an angle regulation initial moment. The photovoltaic angle regulation detection analysis device performs a time difference calculation on the angle regulation initial moment and the scheme determination moment to obtain an angle regulation identification duration. The photovoltaic angle regulation detection analysis device collects a time when the photovoltaic power generation device completes the angle regulation operation and marks as an angle regulation end moment. The photovoltaic angle regulation detection analysis device subtracts the angle regulation initial moment from the angle regulation end moment to obtain an angle regulation operation duration.

The photovoltaic angle regulation detection analysis device collects a tracking angle of the photovoltaic power generation device before regulation as a photovoltaic initial angle value, collects the tracking angle of the photovoltaic power generation device after regulation as a photovoltaic end angle value, performs the difference calculation on the photovoltaic end angle value and the photovoltaic initial angle value to obtain a regulation angle difference value, and performs ratio calculation on the regulation angle difference value and the angle regulation operation duration to obtain an angle regulation efficiency value.

If the angle regulation efficiency value is not within an angle regulation efficiency value range or the angle regulation identification duration exceeds a predetermined angle regulation identification duration threshold, determining that the angle regulation operation is unqualified. If the angle regulation efficiency value is within the angle regulation efficiency value range and the angle regulation identification duration does not exceed the predetermined angle regulation identification duration threshold, determining that the angle regulation operation is qualified.

Furthermore, the photovoltaic angle regulation detection analysis device sends angle control operation qualified information or angle control operation unqualified information to the server for storage when the angle control operation is determined. The photovoltaic angle regulation detection analysis device is further configured to set a photovoltaic detection period with a duration of R1, collect a quantity of times that the operation matching control device controls the photovoltaic power generation device to perform angle regulation operation in the photovoltaic detection period as a photovoltaic angle regulation total frequency value, and collect a quantity of times that unqualified angle regulation operations in the photovoltaic detection period as a photovoltaic angle regulation abnormal frequency value.

The ratio calculation is performed on the photovoltaic angle regulation abnormal frequency value and the photovoltaic angle regulation total frequency value to obtain a photovoltaic angle regulation abnormal table value, and numerical calculation is performed on the photovoltaic angle regulation abnormal table value and the photovoltaic angle regulation abnormal frequency value to obtain a photovoltaic angle regulation evaluation value.

If the photovoltaic angle regulation evaluation value exceeds a predetermined photovoltaic angle regulation evaluation threshold, a photovoltaic angle regulation abnormal signal is generated, and if the photovoltaic angle regulation evaluation value does not exceed the predetermined photovoltaic angle regulation evaluation threshold, the photovoltaic angle regulation normal signal is generated.

Furthermore, the power generation stability supervision device is configured to set detection time points in the power generation process of the photovoltaic power generation device. A time interval between each two adjacent detection time points is a fixed value. The power generation stability supervision device further determines whether the photovoltaic power generation device is in an unstable operation state or not in a to-be-detected detection time point through time point operation stability detection analysis, obtains a frequency of the photovoltaic power generation device in an unstable operation state in unit time, marks the frequency of the photovoltaic power generation device in the unstable operation state as unstable frequency data, and marks a maximum connection number of the detection time points of the photovoltaic power generation device in the unstable operation state as an unstable adjacent numerical detection value.

The power generation stability supervision device further obtains a sunlight intensity curve of a position where the photovoltaic power generation device is located in the unit time, obtains a sunlight intensity average value in the unit time based on the sunlight intensity curve, collects power generation data of the photovoltaic power generation device in the unit time, and performs ratio calculation on the power generation data and the sunlight intensity average value to obtain a power generation detection value, retrieves a predetermined power generation detection judgment value from the server, performs the difference calculation on the power generation detection value and the predetermined power generation detection judgment value, and takes an absolute value thereof to obtain a power generation detection deviation value.

The power generation stability supervision device further performs numerical calculation on the unstable frequency data, the unstable adjacent numerical detection value, and the power generation detection deviation value of the photovoltaic power generation device in the unit time to obtain a stability supervision coefficient. If the stability supervision coefficient exceeds a predetermined stability supervision coefficient threshold, the power generation stability supervision device generates the power generation stability unqualified signal. If the stability supervision coefficient does not exceed the predetermined stability supervision coefficient threshold, the power generation stability supervision device generates the power generation stability qualified signal.

Furthermore, an analysis process of the time point operation stability detection analysis comprises:
  collecting an operation voltage, an operation current and an operation temperature of the photovoltaic power generation device in the to-be-detected detection time point;
  retrieving a predetermined appropriate voltage range of the photovoltaic power generation device from the server, performing mean value calculation on a maximum value and a minimum value of the predetermined appropriate voltage range to obtain an operation voltage standard value; performing the difference calculation on the operation voltage of the photovoltaic power generation device and the operation voltage standard value, and taking an absolute value thereof to obtain an operation voltage feedback value;
  retrieving a predetermined appropriate current range of the photovoltaic power generation device from the server, performing the mean value calculation on a maximum value and a minimum value of the predetermined appropriate current range to obtain an operation current standard value;
  performing the difference calculation on the operation current of the photovoltaic power generation device and the operation current standard value, and taking an absolute value thereof to obtain an operation current feedback value;
  retrieving a predetermined appropriate temperature range of the photovoltaic power generation device from the server, performing the mean value calculation on a maximum value and a minimum value of the predetermined appropriate temperature range to obtain an operation temperature standard value; performing the difference calculation on the operation temperature of the photovoltaic power generation device and the operation temperature standard value, and taking an absolute value thereof to obtain an operation temperature feedback value;

performing the numerical calculation on the operation voltage feedback value, the operation current feedback value, and the operation temperature feedback value to obtain an operation time detection value;

if the operation time detection value exceeds a predetermined operation time detection threshold, determining that the photovoltaic power generation device is in the unstable operation state in the to-be-detected detection time point;

if the operation time detection value does not exceed the predetermined operation time detection threshold, performing the difference calculation on the operation voltage of a current detection time point and the operation voltage of an adjacent previous detection time point, taking an absolute value thereof as an operation voltage amplitude, performing the difference calculation on the operation current of the current detection time point and the operation current of the adjacent previous detection time point, taking an absolute value thereof as an operation current amplitude, performing the difference calculation on the operation temperature of the current detection time point and the operation temperature of the adjacent previous detection time point, taking an absolute value thereof as an operation temperature amplitude, and performing the numerical calculation on the operation voltage amplitude, the operation current amplitude, and the operation temperature amplitude to obtain an operation fluctuation decision value; and if the operation fluctuation detection value exceeds a predetermined operation fluctuation detection threshold, determining that the photovoltaic power generation device in the to-be-detected detection time point is in the unstable operation state.

Furthermore, the server is communicated with a user intelligent terminal. When the server receives the photovoltaic angle regulation abnormal signal or the power generation stability unqualified signal, the server generates an early warning information and sends the early warning information to the user intelligent terminal.

Furthermore, the server is communicated with the automatic regulation feasibility decision-making device, and when the window is in an open state and the photovoltaic power generation device is in an angle automatic regulation mode, the automatic regulation feasibility decision-making device determines an automatic feasibility condition by analyzing to generate an automatic regulation feasibility qualified signal or an automatic regulation unqualified signal. The automatic regulation feasibility unqualified signal is sent to the user intelligent terminal through the server.

The automatic regulation feasibility decision-making device obtains environmental pollutant parameters of a position where the photovoltaic power generation device is located, collects real-time concentration data corresponding to the environmental pollutant parameters in outdoor atmospheric environment. Each of the environmental pollutant parameters is determined to be corresponding to a corresponding pollution coefficient in advance, each of the environmental pollutant parameters is multiplied by the corresponding pollution coefficient, and a product value thereof is marked as a parameter real-time evaluation value of each of the environmental pollutant parameters to obtain parameter real-time evaluation values of the environmental pollutant parameters. The automatic regulation feasibility decision-making device performs the summation calculation on the parameter real-time evaluation values of the outdoor atmospheric environment to obtain an environment pollution detection value.

If the environment pollution detection value exceeds a predetermined environment pollution detection threshold, the automatic regulation feasibility decision-making device generates the automatic regulation feasibility unqualified signal.

If the environmental pollution detection value does not exceed the predetermined environmental pollution detection threshold, the automatic regulation feasibility decision-making device determines a wind direction influence value through wind direction detection analysis and collects rain and snow data and wind power data in the outdoor atmospheric environment. The automatic regulation feasibility decision-making device performs the numerical calculation on the rain and snow data, the wind power data, the wind direction influence value, and the environmental pollution detection value to obtain an automatic regulation feasibility decision coefficient.

If the automatic regulation feasibility decision coefficient exceeds a predetermined automatic regulation feasibility decision coefficient threshold, the automatic regulation feasibility decision-making device generates the automatic regulation feasibility decision coefficient feasibility unqualified signal, and if the automatic regulation feasibility decision coefficient does not exceed the predetermined automatic regulation feasibility decision coefficient threshold, the automatic regulation feasibility decision-making device generates the automatic regulation feasibility qualified signal.

Furthermore, a process of the wind direction detection analysis comprise:

collecting an outdoor wind direction to determine the window is in a leeward side or a windward side; and if the window is in the windward side, giving a wind direction influence value $FX1$ to the window, and if the window is in the leeward side, giving a wind direction influence value $FX2$ to the window. $FX1>FX2>0$.

Furthermore, the server is communicated with the photovoltaic component health state detection device, the server sends the power generation stability unqualified signal to the photovoltaic component health state detection device. The photovoltaic component health state detection device obtains a production interval duration and a total power generation duration of the photovoltaic power generation device, obtains a quantity of times that the photovoltaic power generation device generates the power generation stability qualification signal in a management period and a quantity that the photovoltaic power generation device generates the power generation stability unqualified signal in the management period.

The photovoltaic component health state detection device performs the ratio calculation on the quantity times that the photovoltaic power generation device generates the power generation stability qualification signal in the management period and the quantity that the photovoltaic power generation device generates the power generation stability unqualified signal in the management period to obtain a power generation stability value.

The photovoltaic component health state detection device performs the numerical calculation on the power generation stability value, the production interval duration and the total power generation duration to obtain a photovoltaic health coefficient. If the photovoltaic health coefficient exceeds a predetermined photovoltaic health coefficient threshold, the photovoltaic component health state detection device generates a photovoltaic health state unqualified signal and sends the photovoltaic health state unqualified signal to the user intelligent terminal through the server.

In the present disclosure, the sun tracking feedback device automatically tracks the movement of the sun, the operation matching control device determines the regulation scheme based on the sun tracking information and the angle regulation strategy, and the operation matching control device drives the photovoltaic power generation device to regulate the tracking angle of the photovoltaic power generation device, so that the photovoltaic power generation device receives the solar energy to the maximum extent. Further, the photovoltaic angle regulation detection analysis device detects and analyzes the angle regulation operation of the photovoltaic power generation device to determine whether the angle regulation operation is qualified or unqualified and to evaluate the abnormal regulation condition of the photovoltaic detection period. The power generation stability supervision device detects and analyzes the power generation process of the photovoltaic power generation device to generate the power generation stability qualified signal or the power generation stability unqualified signal, so that causes of the abnormal regulation condition is investigated in time and related components are inspected and repaired as needed to ensure subsequent power generation efficiency, safety and stability of the window operation management system.

In the present disclosure, the automatic regulation feasibility decision-making device determines an automatic feasibility condition by analyzing to generate the automatic regulation feasibility qualified signal or the automatic regulation unqualified signal, which is convenient for the user to close the angle automatic regulation mode of the photovoltaic power generation device in time, to close the window or to reduce an opening angle of the window in time through a remote operation, so as to minimize an adverse impact of external environmental conditions on an interior of a room. Further, when the power generation stability unqualified signal is generated, the photovoltaic component health state detection device analyzes and determines a photovoltaic health state, so that the user can eliminate and replace the photovoltaic power generation device in time to further ensure subsequent power generation efficiency and safety of use.

BRIEF DESCRIPTION OF DRAWINGS

In order to facilitate understanding by those skilled in the art, the present disclosure will be further described below in conjunction with the accompanying drawings.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Embodiment 1

Figure 1:
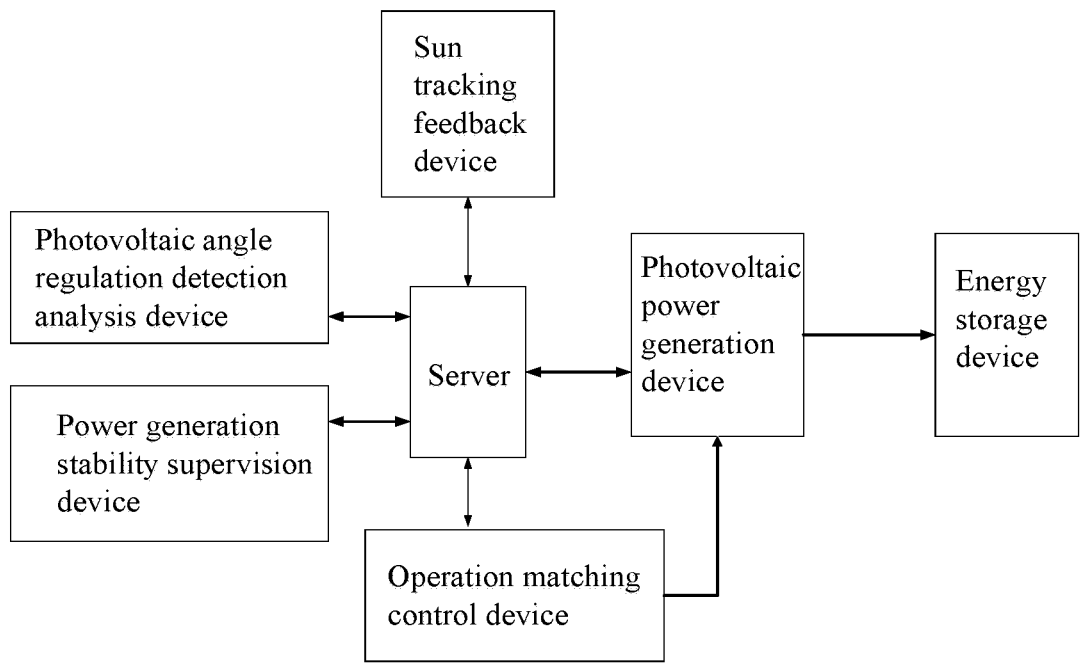
FIG. 1 is a first block diagram of a window operation management system according to a first embodiment of the present disclosure.
Figure 2:
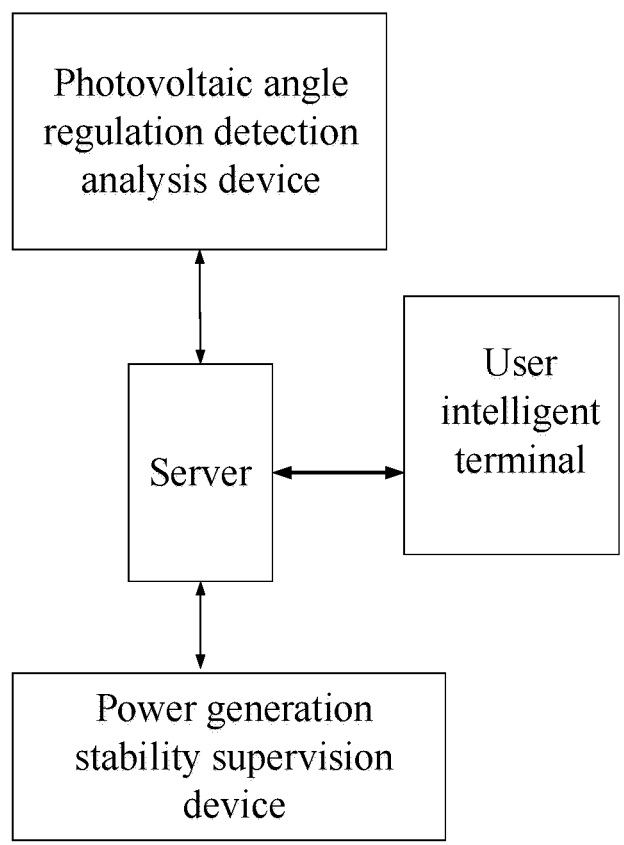
FIG. 2 is a second block diagram of the window operation management system according to a first embodiment of the present disclosure.

As shown in FIGS. 1 and 2, the present disclosure provides a window operation management system based on an integrated sun tracker. The window operation management system comprises a server, a photovoltaic power generation device, an energy storage device, a sun tracking feedback device, an operation matching control device, a photovoltaic angle regulation detection analysis device and a power generation stability supervision device.

The photovoltaic power generation device is installed on a glass of a window. The photovoltaic power generation device generates power by converting solar energy into electric energy. The photovoltaic power generation device is communicated with the energy storage device so as to transmit the electric energy to the energy storage device. The energy storage device is configured to store the electric energy. The device B is electrically connected to an electrical device and supplies power to the electrical device.

The sun tracking feedback device is configured to sense a position of the sun through a light sensor so as to automatically track a movement of the sun. The sun tracking feedback device is further configured to send sun tracking information to the operation matching control device through the server.

The operation matching control device is configured to retrieve an angle regulation strategy of the photovoltaic power generation device from the server. The operation matching control device is further configured to determine a regulation scheme based on the sun tracking information and the angle regulation strategy and drive the photovoltaic power generation device to regulate a tracking angle according to the regulation scheme, so that the photovoltaic power generation device receives the solar energy to a maximum extent. Therefore, the present disclosure realizes automatic adaptive regulation, significantly improves power generation efficiency, and effectively improves an intelligence and automation level of the window.

The photovoltaic angle regulation detection analysis device is configured to detect and analyze an angle regulation operation of the photovoltaic power generation device and determine the angle regulation operation is qualified or unqualified. The photovoltaic angle regulation detection analysis device is further configured to analyze and evaluate an abnormal regulation condition of the operation matching control device in a photovoltaic detection period to generate a photovoltaic angle regulation normal signal or a photovoltaic angle regulation abnormal signal, and send the photovoltaic angle regulation normal signal or the photovoltaic angle regulation abnormal signal to the server. When the server receives the photovoltaic angle regulation abnormal signal, the server generates an early warning information and sends the early warning information to a user intelligent terminal, so that the user can have a detailed understanding of the abnormal angle regulation of the photovoltaic power generation device in the window, and promptly investigates the cause and inspects and repairs corresponding parts, so as to ensure subsequent stable operation of the present disclosure.

A working process of the photovoltaic angle regulation detection analysis device is as follow:

After the operation matching control device controls the photovoltaic power generation device to complete the angle regulation operation, the photovoltaic angle regulation detection analysis device collects a final tracking angle of the photovoltaic power generation device, marks the final tracking angle as a measured actual regulation angle value, obtains a required tracking angle to be reached by the angle regulation operation based on the regulation scheme, marks the required tracking angle as a regulation standard angle value, performs a difference calculation on the measured actual regulation angle value and the regulation standard angle value, and takes an absolute value thereof as an angle regulation difference value of the angle regulation operation. Then, the angle regulation difference value is compared with a predetermined angle regulation difference threshold.

If the angle regulation difference value exceeds the predetermined angle regulation difference threshold, it indicates that an angle regulation accuracy of the angle regulation operation is poor, and the photovoltaic angle regulation detection analysis device determines that the angle regulation operation is unqualified.

If the angle regulation difference value does not exceed the predetermined angle regulation difference threshold, the photovoltaic angle regulation detection analysis device collects a time when the operation matching control device determines the regulation scheme and marks as a scheme determination moment. The photovoltaic angle regulation detection analysis device collects a time when the photovoltaic power generation device starts to perform the angle regulation operation and marks as an angle regulation initial moment. The photovoltaic angle regulation detection analysis device performs a time difference calculation on the angle regulation initial moment and the scheme determination moment to obtain an angle regulation identification duration. The photovoltaic angle regulation detection analysis device collects a time when the photovoltaic power generation device completes the angle regulation operation and marks as an angle regulation end moment. The photovoltaic angle regulation detection analysis device subtracts the angle regulation initial moment from the angle regulation end moment to obtain an angle regulation operation duration.

The photovoltaic angle regulation detection analysis device collects a tracking angle of the photovoltaic power generation device before regulation as a photovoltaic initial angle value, collects the tracking angle of the photovoltaic power generation device after regulation as a photovoltaic end angle value, performs difference calculation on the photovoltaic end angle value and the photovoltaic initial angle value to obtain a regulation angle difference value, and performs a ratio calculation on the regulation angle difference value and the angle regulation operation duration to obtain an angle regulation efficiency value.

It should be noted that the greater the angle regulation identification duration, the slower the response corresponding to the angle regulation operation is, and the greater a possibility of abnormality exists. If the angle adjustment efficiency value is too large or too small, it is indicated that a process of the angle regulation operation is abnormal. Then the angle regulation efficiency value and angle regulation identification duration are respectively compared with an angle regulation efficiency value range and a predetermined angle regulation identification duration threshold. If the angle regulation efficiency value is not within the angle regulation efficiency value range or the angle regulation identification duration exceeds the predetermined angle regulation identification duration threshold, determining that the angle regulation operation is unqualified. If the angle regulation efficiency value is within the angle regulation efficiency value range and the angle regulation identification duration does not exceed the predetermined angle regulation identification duration threshold, determining that the angle regulation operation is qualified.

Furthermore, the photovoltaic angle regulation detection analysis device sends angle control operation qualified information or angle control operation unqualified information to the server for storage when the angle control operation is determined. The photovoltaic angle regulation detection analysis device is further configured to set a photovoltaic detection period with a duration of R1. Optionally, the photovoltaic detection period is seven days. The photovoltaic angle regulation detection analysis device collect a quantity of times that the operation matching control device controls the photovoltaic power generation device to perform angle regulation operation in the photovoltaic detection period as a photovoltaic angle regulation total frequency value, and collect a quantity of times that unqualified angle regulation operations in the photovoltaic detection period as a photovoltaic angle regulation abnormal frequency value. The ratio calculation is performed on the photovoltaic angle regulation abnormal frequency value and the photovoltaic angle regulation total frequency value to obtain a photovoltaic angle regulation abnormal table value.

The numerical calculation is performed on the photovoltaic angle regulation abnormal table value RT and the photovoltaic angle regulation abnormal frequency value RY to obtain a photovoltaic angle regulation evaluation value RF by a formula $RF=fg1*RT+fg2*RY$. $fg1$ and $fg2$ are predetermined weight coefficients, and $fg1>fg2>0$. Further, the greater the photovoltaic angle regulation evaluation value RF, the worse a performance condition of the angle regulation operation in the photovoltaic detection period. Then, the photovoltaic angle regulation evaluation value is compared with a predetermined photovoltaic angle regulation evaluation threshold. If the photovoltaic angle regulation evaluation value exceeds the predetermined photovoltaic angle regulation evaluation threshold, a photovoltaic angle regulation abnormal signal is generated, and if the photovoltaic angle regulation evaluation value does not exceed the predetermined photovoltaic angle regulation evaluation threshold, the photovoltaic angle regulation normal signal is generated.

The power generation stability supervision device is configured to detect and analyze a power generation process of the photovoltaic power generation device to generate a power generation stability qualified signal or a power generation stability unqualified signal, and is configured to send the power generation stability qualified signal or the power generation stability unqualified signal to the server.

When receiving the power generation stability unqualified signal, the server generates the early warning information and sends the early warning information to the user intelligent terminal. When the user receives the early warning information, reason investigation is carried out in time and inspection and repair of the corresponding components are carried out according to needs, so that the safety and stability of subsequent power generation process are ensured, and the subsequent power generation efficiency is ensured.

A working process of the power generation stability supervision device is as follow: the power generation stability supervision device is configured to set detection time points in the power generation process of the photovoltaic power generation device. A time interval between each two adjacent detection time points is a fixed value. The power generation stability supervision device further determines whether the photovoltaic power generation device is in an unstable operation state or not in a to-be-detected detection time point through time point operation stability detection analysis.

Furthermore, an analysis process of the time point operation stability detection analysis comprises:

collecting an operation voltage, an operation current and an operation temperature of the photovoltaic power generation device in the to-be-detected detection time point;

retrieving a predetermined appropriate voltage range of the photovoltaic power generation device from the server, performing mean value calculation on a maximum value and a minimum value of the predetermined appropriate voltage range to obtain an operation voltage standard value; performing the difference calculation on the operation voltage of the photovoltaic power generation device and the operation voltage standard value, and taking an absolute value thereof to obtain an operation voltage feedback value;

retrieving a predetermined appropriate current range of the photovoltaic power generation device from the server, performing the mean value calculation on a maximum value and a minimum value of the predetermined appropriate current range to obtain an operation current standard value;

performing the difference calculation on the operation current of the photovoltaic power generation device and the operation current standard value, and taking an absolute value thereof to obtain an operation current feedback value;

retrieving a predetermined appropriate temperature range of the photovoltaic power generation device from the server, performing the mean value calculation on a maximum value and a minimum value of the predetermined appropriate temperature range to obtain an operation temperature standard value; performing the difference calculation on the operation temperature of the photovoltaic power generation device and the operation temperature standard value, and taking an absolute value thereof to obtain an operation temperature feedback value;

performing the numerical calculation on the operation voltage feedback value QW, the operation current feedback value QW, and the operation temperature feedback value QF to obtain an operation time detection value QK through a formula QK=fd1*QW+fd2*QR+fd3*QF; where fd1, fd2, and fd3 are predetermined weight coefficients, and fd1, fd2, and fd3 are all greater than zero; and, the greater the operation time detection value QK, the worse the operating status of the photovoltaic power generation device at the to-be-detected time point;

comparing the operation time detection value with a predetermined operation time detection threshold; if the operation time detection value exceeds the predetermined operation time detection threshold, determining that the photovoltaic power generation device is in the unstable operation state in the to-be-detected detection time point;

if the operation time detection value QK does not exceed the predetermined operation time detection threshold, performing the difference calculation on the operation voltage of a current detection time point and the operation voltage of an adjacent previous detection time point, taking an absolute value thereof as an operation voltage amplitude, performing the difference calculation on the operation current of the current detection time point and the operation current of the adjacent previous detection time point, taking an absolute value thereof as an operation current amplitude, performing the difference calculation on the operation temperature of the current detection time point and the operation temperature of the adjacent previous detection time point, taking an absolute value thereof as an operation temperature amplitude, and performing the numerical calculation on the operation voltage amplitude PY, the operation current amplitude PX, and the operation temperature amplitude PR to obtain an operation fluctuation decision value PK through a formula PK=ed1*PY+ed2*PX+ed3*PR, where ed1, ed2, and ed3 are predetermined weight coefficients, ed1, ed2, and ed3 are all greater than zero; and the larger the operation fluctuation decision value PK, the worse the operating status of the photovoltaic power generation device at the to-be-detected time point; and comparing the operation fluctuation detection value with a predetermined operation fluctuation detection threshold; if the operation fluctuation detection value exceeds the predetermined operation fluctuation detection threshold, determining that the photovoltaic power generation device in the to-be-detected detection time point is in the unstable operation state.

The power generation stability supervision device obtains a frequency of the photovoltaic power generation device in an unstable operation state in unit time, marks the frequency of the photovoltaic power generation device in the unstable operation state as unstable frequency data, and marks a maximum connection number of the detection time points of the photovoltaic power generation device in the unstable operation state as an unstable adjacent numerical detection value. The power generation stability supervision device further obtains a sunlight intensity curve of a position where the photovoltaic power generation device is located in the unit time, obtains a sunlight intensity average value in the unit time based on the sunlight intensity curve, collects power generation data of the photovoltaic power generation device in the unit time, and performs the ratio calculation on the power generation data and the sunlight intensity average value to obtain a power generation detection value; retrieves a predetermined power generation detection judgment value from the server, performs the difference calculation on the power generation detection value and the predetermined power generation detection judgment value, and takes an absolute value thereof to obtain a power generation detection deviation value.

The power generation stability supervision device further performs the numerical calculation on the unstable frequency data HB, the unstable adjacent numerical detection value HT, and the power generation detection deviation value HY of the photovoltaic power generation device in the unit time to obtain a stability supervision coefficient WJ through a formula WJ=tp1*HB+tp2*HT+tp3*HY. tp1, tp2, and tp3 are predetermined weight coefficients, and tp1, tp2, and tp3 are all greater than zero. The greater the stability supervision coefficient WJ, the worse the operating status of the power generation process of the photovoltaic power generation device per unit time; Then the stability supervision coefficient is compared with a predetermined stability supervision coefficient threshold. If the stability supervision coefficient WJ exceeds the predetermined stability supervision coefficient threshold, the power generation stability supervision device generates the power generation stability unqualified signal. If the stability supervision coefficient WJ does not exceed the predetermined stability supervision coefficient threshold, the power generation stability supervision device generates the power generation stability qualified signal.

Embodiment 2

Figure 3:
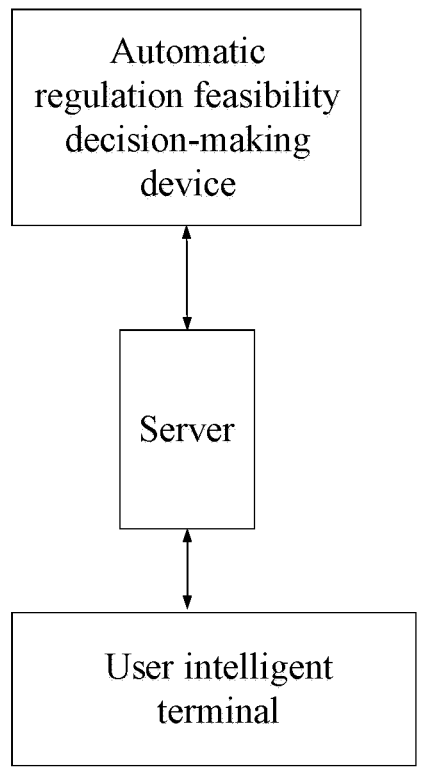
FIG. 3 is a block diagram of the window operation management system according to a second embodiment of the present disclosure.

As shown in FIG. 3, differences between the embodiment 3 and the embodiment 2 is as follow:

Furthermore, the server is communicated with the automatic regulation feasibility decision-making device, and when the window is in an open state and the photovoltaic power generation device is in an angle automatic regulation mode, the automatic regulation feasibility decision-making device determines an automatic feasibility condition by analyzing to generate an automatic regulation feasibility qualified signal or an automatic regulation unqualified signal. The automatic regulation feasibility unqualified signal is sent to the user intelligent terminal through the server.

When the user receives the automatic regulation feasibility unqualified signal, the angle automatic regulation mode of the photovoltaic power generation device should be closed in time, and the window should be closed or an opening degree of the window should be reduced according to needs (which can be carried out through manual operation or remote operation), so that an adverse effect of the external environment condition on a room is reduced as much as possible.

A working process of the automatic regulation feasibility decision-making device is as follow:

The automatic regulation feasibility decision-making device obtains environmental pollutant parameters (Including dust concentration, sulfur dioxide concentration, etc.) of a position where the photovoltaic power generation device is located, collects real-time concentration data corresponding to the environmental pollutant parameters in outdoor atmospheric environment. Each of the environmental pollutant parameters is determined to be corresponding to a corresponding pollution coefficient in advance. It should be noted that values of the pollution coefficients are all greater than zero, and the pollution coefficients are predetermined by the user and are stored in the server. Moreover, the greater the pollution coefficients, the greater the harm caused by the corresponding environmental pollution parameters. Each of the environmental pollutant parameters is multiplied by the corresponding pollution coefficient, and a product value thereof is marked as a parameter real-time evaluation value of each of the environmental pollutant parameters to obtain parameter real-time evaluation values of the environmental pollutant parameters. The automatic regulation feasibility decision-making device performs a summation calculation on the parameter real-time evaluation values of the outdoor atmospheric environment to obtain an environment pollution detection value. It should be noted that the greater the environment pollution detection value, the more serious a current pollution situation in the outdoor environment is.

Then the environment pollution detection value is compared with a predetermined environment pollution detection threshold. If the environment pollution detection value exceeds the predetermined environment pollution detection threshold, it indicates that the current pollution situation of the outdoor environment is serious, and the automatic regulation feasibility decision-making device generates the automatic regulation feasibility unqualified signal. If the environmental pollution detection value does not exceed the predetermined environmental pollution detection threshold, the automatic regulation feasibility decision-making device determines a wind direction influence value through wind direction detection analysis. Specifically, a process of the wind direction detection analysis comprise collecting an outdoor wind direction to determine the window is in a leeward side or a windward side. It should be noted that when the window is on the windward side rather than on the leeward side, outdoor windy conditions have a greater impact on indoor facilities; If the window is in the windward side, giving a wind direction influence value FX1 to the window, and if the window is in the leeward side, giving a wind direction influence value FX2 to the window. FX1>FX2>0.

The automatic regulation feasibility decision-making device collects rain and snow data and wind power data in the outdoor atmospheric environment. The rain and snow data is data values that represent an amount of rain and snow outside, and wind power data are data values that represent wind speed.

The automatic regulation feasibility decision-making device performs the numerical calculation on the rain and snow data YX, the wind power data YF, the wind direction influence value YG, and the environmental pollution detection value YW to obtain an automatic regulation feasibility decision coefficient ZT through a formula $$ZT = (YG + bt3) * \sqrt{\frac{bt1*YX + bt2*YF + bt4*YW}{bt1 + bt2 + bt3 + bt4}},$$

where the wind direction influence value YG is FX1 or FX2, bt1, bt2, bt3, and bt4 are predetermined proportional coefficients, bt1, bt2, bt3, and bt4 are all greater than zero; and, the greater the automatic regulation feasibility decision coefficient ZT, the greater a potential adverse impact of external environmental conditions on indoor environment. Then the automatic regulation feasibility decision coefficient is compared with a predetermined automatic regulation feasibility decision coefficient threshold. If the automatic regulation feasibility decision coefficient exceeds a predetermined automatic regulation feasibility decision coefficient threshold, the automatic regulation feasibility decision-making device generates the automatic regulation feasibility decision coefficient feasibility unqualified signal, and if the automatic regulation feasibility decision coefficient does not exceed the predetermined automatic regulation feasibility decision coefficient threshold, the automatic regulation feasibility decision-making device generates the automatic regulation feasibility qualified signal.

Embodiment 3

Figure 4:
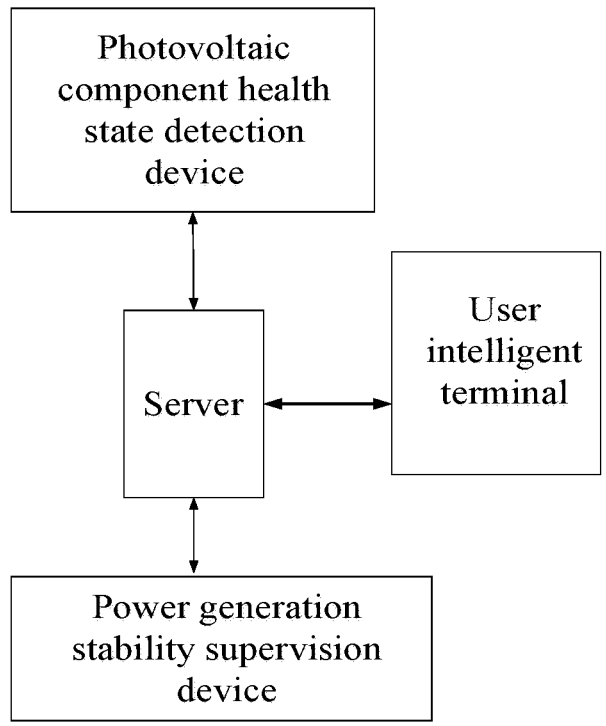
FIG. 4 is a block diagram of the window operation management system according to a third embodiment of the present disclosure.

As shown in FIG. 4, differences between the embodiment 3 and the embodiments 1 and 2 are as follow:

The server is communicated with the photovoltaic component health state detection device, the server sends the power generation stability unqualified signal to the photovoltaic component health state detection device. The photovoltaic component health state detection device obtains a production interval duration and a total power generation duration of the photovoltaic power generation device. The production interval duration represents the interval between a production date of the window operation management system and a current date, and total power generation duration represents total time of the window operation management system in the power generation process. The photovoltaic component health state detection device obtains a quantity of times that the photovoltaic power generation device generates the power generation stability qualification signal in a management period and a quantity that the photovoltaic power generation device generates the power generation stability unqualified signal in the management period. Optionally, the management period is three months. The photovoltaic component health state detection device performs the ratio calculation on the quantity times that the photovoltaic power generation device generates the power generation stability qualification signal in the management period and the quantity that the photovoltaic power generation device generates the power generation stability unqualified signal in the management period to obtain a power generation stability value.

The photovoltaic component health state detection device performs the numerical calculation on the power generation stability value FY, the production interval duration FS and the total power generation duration FG to obtain a photovoltaic health coefficient GK through a formula $$GK = a1*FY + \sqrt{\frac{a2*FS + a3*FG}{a1 + a2 + a3}}.$$

a1, a2, a3 are predetermined proportional coefficients, a1>a3>a2>0; and, the greater the photovoltaic health coefficient GK, the worse the health state of the photovoltaic power generation device, the more timely the photovoltaic power generation device needs to be eliminated; Then, the photovoltaic health coefficient is compared with a predetermined photovoltaic health coefficient threshold. If the photovoltaic health coefficient exceeds the predetermined photovoltaic health coefficient threshold, the photovoltaic component health state detection device generates a photovoltaic health state unqualified signal and sends the photovoltaic health state unqualified signal to the user intelligent terminal through the server. When the user receives the photovoltaic health state unqualified signal, the user should eliminate and replace the photovoltaic power generation device in time to ensure subsequent power generation efficiency and safety of use.

A working principle of the present disclosure is as follow:

The photovoltaic power generation device generates power by converting the solar energy into the electric energy. The sun tracking feedback device is configured to sense the position of the sun through the light sensor so as to automatically track the movement of the sun. The operation matching control device is configured to determine the regulation scheme based on the sun tracking information and the angle regulation strategy and drive the photovoltaic power generation device to regulate the tracking angle according to the regulation scheme, so that the photovoltaic power generation device receives the solar energy to the maximum extent. Therefore, the present disclosure realizes automatic adaptive regulation, significantly improves power generation efficiency, and effectively improves an intelligence and automation level of the window. Further, the photovoltaic angle regulation detection analysis device detects and analyzes the angle regulation operation of the photovoltaic power generation device to determine whether the angle regulation operation is qualified or unqualified and to evaluate the abnormal regulation condition of the operation matching control device in the photovoltaic detection period. Therefore, the user is able to promptly investigate the cause and inspect and repair the corresponding components to ensure the subsequent stable operation of the photovoltaic power generation device. The power generation stability supervision device detects and analyzes the power generation process of the photovoltaic power generation device to generate the power generation stability qualified signal or the power generation stability unqualified signal, so that causes of the abnormal regulation condition is investigated in time and related components are inspected and repaired as needed to ensure subsequent power generation efficiency, safety and stability of the window operation management system.

All the above formulas are the numerical calculation of the de-dimension, the formulas are formulas most closest to a real situation that are obtained by performing software simulation on a large amount of data, and the predetermined parameters in the formulas are determined by those skilled in the art according to actual situations. The optional embodiments of the present disclosure disclosed above are merely used to help illustrate the present disclosure. The optional embodiment does not describe all details, and does not limit the specific implementation of the present disclosure. Obviously, modifications and variations can be made according to the contents of the specification. These embodiments selected and illustrated therein are for better explain the principles and practical application of the present disclosure, so that those skilled in the art can better understand and utilize the present disclosure. The present disclosure is limited only by the claims and full scope and equivalents thereof.

What is claimed is:

1. A window operation management system, comprising: a server, a photovoltaic power generation device, an energy storage device, a sun tracking feedback device, an operation matching control device, a photovoltaic angle regulation detection analysis device and a power generation stability supervision device;

wherein the photovoltaic power generation device is installed on a glass of a window; the photovoltaic power generation device generates power by converting solar energy into electric energy and transmits the electric energy to the energy storage device; the energy storage device is configured to store the electric energy;

the sun tracking feedback device is configured to sense a position of the sun through a light sensor so as to automatically track a movement of the sun; the sun tracking feedback device is further configured to send sun tracking information to the operation matching control device through the server;

the operation matching control device is configured to retrieve an angle regulation strategy of the photovoltaic power generation device from the server; the operation matching control device is further configured to determine a regulation scheme based on the sun tracking information and the angle regulation strategy and drive the photovoltaic power generation device to regulate a tracking angle according to the regulation scheme, so that the photovoltaic power generation device receives the solar energy to a maximum extent;

the photovoltaic angle regulation detection analysis device is configured to detect and analyze an angle regulation operation of the photovoltaic power generation device and determine the angle regulation operation is qualified or unqualified; the photovoltaic angle regulation detection analysis device is further configured to analyze and evaluate an abnormal regulation condition of the operation matching control device in a photovoltaic detection period to generate a photovoltaic angle regulation normal signal or a photovoltaic angle regulation abnormal signal, and send the photovoltaic angle regulation normal signal or the photovoltaic angle regulation abnormal signal to the server; and the power generation stability supervision device is configured to detect and analyze a power generation process of the photovoltaic power generation device to generate a power generation stability qualified signal or a power generation stability unqualified signal, and is configured to send the power generation stability qualified signal or the power generation stability unqualified signal to the server.

2. The window operation management system according to claim 1, wherein after the operation matching control device controls the photovoltaic power generation device to complete the angle regulation operation, the photovoltaic angle regulation detection analysis device collects a final tracking angle of the photovoltaic power generation device, marks the final tracking angle as a measured actual regulation angle value, obtains a required tracking angle to be reached by the angle regulation operation based on the regulation scheme, marks the required tracking angle as a regulation standard angle value, performs a difference calculation on the measured actual regulation angle value and the regulation standard angle value, and takes an absolute value thereof as an angle regulation difference value of the angle regulation operation;

if the angle regulation difference value exceeds a predetermined angle regulation difference threshold, the photovoltaic angle regulation detection analysis device determines that the angle regulation operation is unqualified;

if the angle regulation difference value does not exceed the predetermined angle regulation difference threshold, the photovoltaic angle regulation detection analysis device collects a time when the operation matching control device determines the regulation scheme and marks as a scheme determination moment; and the photovoltaic angle regulation detection analysis device collects a time when the photovoltaic power generation device starts to perform the angle regulation operation and marks as an angle regulation initial moment; the photovoltaic angle regulation detection analysis device performs a time difference calculation on the angle regulation initial moment and the scheme determination moment to obtain an angle regulation identification duration; the photovoltaic angle regulation detection analysis device collects a time when the photovoltaic power generation device completes the angle regulation operation and marks as an angle regulation end moment; the photovoltaic angle regulation detection analysis device subtracts the angle regulation initial moment from the angle regulation end moment to obtain an angle regulation operation duration;

the photovoltaic angle regulation detection analysis device collects a tracking angle of the photovoltaic power generation device before regulation as a photovoltaic initial angle value, collects the tracking angle of the photovoltaic power generation device after regulation as a photovoltaic end angle value, performs the difference calculation on the photovoltaic end angle value and the photovoltaic initial angle value to obtain a regulation angle difference value, and performs a ratio calculation on the regulation angle difference value and the angle regulation operation duration to obtain an angle regulation efficiency value;

if the angle regulation efficiency value is not within an angle regulation efficiency value range or the angle regulation identification duration exceeds a predetermined angle regulation identification duration threshold, determining that the angle regulation operation is unqualified; and if the angle regulation efficiency value is within the angle regulation efficiency value range and the angle regulation identification duration does not exceed the predetermined angle regulation identification duration threshold, determining that the angle regulation operation is qualified.

3. The window operation management system according to claim 2, wherein the photovoltaic angle regulation detection analysis device sends angle control operation qualified information or angle control operation unqualified information to the server for storage when the angle control operation is determined; the photovoltaic angle regulation detection analysis device is further configured to set a photovoltaic detection period with a duration of R1, collect a quantity of times that the operation matching control device controls the photovoltaic power generation device to perform angle regulation operation in the photovoltaic detection period as a photovoltaic angle regulation total frequency value, and collect a quantity of times that unqualified angle regulation operations in the photovoltaic detection period as a photovoltaic angle regulation abnormal frequency value;

wherein the ratio calculation is performed on the photovoltaic angle regulation abnormal frequency value and the photovoltaic angle regulation total frequency value to obtain a photovoltaic angle regulation abnormal table value, and numerical calculation is performed on the photovoltaic angle regulation abnormal table value and the photovoltaic angle regulation abnormal frequency value to obtain a photovoltaic angle regulation evaluation value;

if the photovoltaic angle regulation evaluation value exceeds a predetermined photovoltaic angle regulation evaluation threshold, a photovoltaic angle regulation abnormal signal is generated, and if the photovoltaic angle regulation evaluation value does not exceed the predetermined photovoltaic angle regulation evaluation threshold, the photovoltaic angle regulation normal signal is generated.

4. The window operation management system according to claim 1, wherein the power generation stability supervision device is configured to set detection time points in the power generation process of the photovoltaic power generation device; a time interval between each two adjacent detection time points is a fixed value; the power generation stability supervision device further determines whether the photovoltaic power generation device is in an unstable operation state or not in a to-be-detected detection time point through time point operation stability detection analysis, obtains a frequency of the photovoltaic power generation device in an unstable operation state in unit time, marks the frequency of the photovoltaic power generation device in the unstable operation state as unstable frequency data, and marks a maximum connection number of the detection time points of the photovoltaic power generation device in the unstable operation state as an unstable adjacent numerical detection value;

the power generation stability supervision device further obtains a sunlight intensity curve of a position where the photovoltaic power generation device is located in the unit time, obtains a sunlight intensity average value in the unit time based on the sunlight intensity curve, collects power generation data of the photovoltaic power generation device in the unit time, and performs a ratio calculation on the power generation data and the sunlight intensity average value to obtain a power generation detection value; retrieves a predetermined power generation detection judgment value from the server, performs a difference calculation on the power generation detection value and the predetermined power generation detection judgment value, and takes an absolute value thereof to obtain a power generation detection deviation value;

the power generation stability supervision device further performs a numerical calculation on the unstable frequency data, the unstable adjacent numerical detection value and the power generation detection deviation value of the photovoltaic power generation device in the unit time to obtain a stability supervision coefficient; if the stability supervision coefficient exceeds a predetermined stability supervision coefficient threshold, the power generation stability supervision device generates the power generation stability unqualified signal; if the stability supervision coefficient does not exceed the predetermined stability supervision coefficient threshold, the power generation stability supervision device generates the power generation stability qualified signal.

5. The window operation management system according to claim 4, wherein an analysis process of the time point operation stability detection analysis comprises:

collecting an operation voltage, an operation current and an operation temperature of the photovoltaic power generation device in the to-be-detected detection time point, retrieving a predetermined appropriate voltage range of the photovoltaic power generation device from the server, performing a mean value calculation on a maximum value and a minimum value of the predetermined appropriate voltage range to obtain an operation voltage standard value; performing the difference calculation on the operation voltage of the photovoltaic power generation device and the operation voltage standard value, and taking an absolute value thereof to obtain an operation voltage feedback value;

retrieving a predetermined appropriate current range of the photovoltaic power generation device from the server, performing the mean value calculation on a maximum value and a minimum value of the predetermined appropriate current range to obtain an operation current standard value; performing the difference calculation on the operation current of the photovoltaic power generation device and the operation current standard value, and taking an absolute value thereof to obtain an operation current feedback value;

retrieving a predetermined appropriate temperature range of the photovoltaic power generation device from the server, performing the mean value calculation on a maximum value and a minimum value of the predetermined appropriate temperature range to obtain an operation temperature standard value; performing the difference calculation on the operation temperature of the photovoltaic power generation device and the operation temperature standard value, and taking an absolute value thereof to obtain an operation temperature feedback value;

performing the numerical calculation on the operation voltage feedback value, the operation current feedback value, and the operation temperature feedback value to obtain an operation time detection value;

if the operation time detection value exceeds a predetermined operation time detection threshold, determining that the photovoltaic power generation device is in the unstable operation state in the to-be-detected detection time point;

if the operation time detection value does not exceed the predetermined operation time detection threshold, performing the difference calculation on the operation voltage of a current detection time point and the operation voltage of an adjacent previous detection time point, taking an absolute value thereof as an operation voltage amplitude, performing the difference calculation on the operation current of the current detection time point and the operation current of the adjacent previous detection time point, taking an absolute value thereof as an operation current amplitude, performing the difference calculation on the operation temperature of the current detection time point and the operation temperature of the adjacent previous detection time point, taking an absolute value thereof as an operation temperature amplitude, and performing the numerical calculation on the operation voltage amplitude, the operation current amplitude, and the operation temperature amplitude to obtain an operation fluctuation decision value;

if the operation fluctuation detection value exceeds a predetermined operation fluctuation detection threshold, determining that the photovoltaic power generation device in the to-be-detected detection time point is in the unstable operation state.

6. The window operation management system according to claim 1, wherein the server is communicated with a user intelligent terminal; when the server receives the photovoltaic angle regulation abnormal signal or the power generation stability unqualified signal, the server generates an early warning information and sends the early warning information to the user intelligent terminal.

7. The window operation management system according to claim 6, wherein the server is communicated with the automatic regulation feasibility decision-making device; when the window is in an open state and the photovoltaic power generation device is in an angle automatic regulation mode, the automatic regulation feasibility decision-making device determines an automatic feasibility condition by analyzing to generate an automatic regulation feasibility qualified signal or an automatic regulation unqualified signal; the automatic regulation feasibility unqualified signal is sent to the user intelligent terminal through the server;

the automatic regulation feasibility decision-making device obtains environmental pollutant parameters of a position where the photovoltaic power generation device is located and collects real-time concentration data corresponding to the environmental pollutant parameters in outdoor atmospheric environment; each of the environmental pollutant parameters is determined to be corresponding to a corresponding pollution coefficient in advance, each of the environmental pollutant parameters is multiplied by the corresponding pollution coefficient, and a product value thereof is marked as a parameter real-time evaluation value of each of the environmental pollutant parameters to obtain parameter real-time evaluation values of the environmental pollutant parameters; the automatic regulation feasibility decision-making device performs a summation calculation on the parameter real-time evaluation values of the outdoor atmospheric environment to obtain an environment pollution detection value;

if the environment pollution detection value exceeds a predetermined environment pollution detection threshold, the automatic regulation feasibility decision-making device generates the automatic regulation feasibility unqualified signal;

if the environmental pollution detection value does not exceed the predetermined environmental pollution detection threshold, the automatic regulation feasibility decision-making device determines a wind direction influence value through wind direction detection analysis and collects rain and snow data and wind power data in the outdoor atmospheric environment; the automatic regulation feasibility decision-making device performs a numerical calculation on the rain and snow data, the wind power data, the wind direction influence value, and the environmental pollution detection value to obtain an automatic regulation feasibility decision coefficient;

if the automatic regulation feasibility decision coefficient exceeds a predetermined automatic regulation feasibility decision coefficient threshold, the automatic regulation feasibility decision-making device generates the automatic regulation feasibility decision coefficient feasibility unqualified signal, and if the automatic regulation feasibility decision coefficient does not exceed the predetermined automatic regulation feasibility decision coefficient threshold, the automatic regulation feasibility decision-making device generates the automatic regulation feasibility qualified signal.

8. The window operation management system according to claim 7, wherein a process of the wind direction detection analysis comprise:

collecting an outdoor wind direction to determine the window is in a leeward side or a windward side; if the window is in the windward side, giving a wind direction influence value FX1 to the window, and if the window is in the leeward side, giving a wind direction influence value FX2 to the window; wherein FX1>FX2>0.

9. The window operation management system according to claim 6, wherein the server is communicated with the photovoltaic component health state detection device, the server sends the power generation stability unqualified signal to the photovoltaic component health state detection device; the photovoltaic component health state detection device obtains a production interval duration and a total power generation duration of the photovoltaic power generation device, and obtains a quantity of times that the photovoltaic power generation device generates the power generation stability qualification signal in a management period and a quantity that the photovoltaic power generation device generates the power generation stability unqualified signal in the management period, the photovoltaic component health state detection device performs a ratio calculation on the quantity times that the photovoltaic power generation device generates the power generation stability qualification signal in the management period and the quantity that the photovoltaic power generation device generates the power generation stability unqualified signal in the management period to obtain a power generation stability value;

the photovoltaic component health state detection device performs a numerical calculation on the power generation stability value, the production interval duration and the total power generation duration to obtain a photovoltaic health coefficient; if the photovoltaic health coefficient exceeds a predetermined photovoltaic health coefficient threshold, the photovoltaic component health state detection device generates a photovoltaic health state unqualified signal and sends the photovoltaic health state unqualified signal to the user intelligent terminal through the server.

\* \* \* \* \*